(12) United States Patent
Hightower

(10) Patent No.: US 10,762,344 B2
(45) Date of Patent: Sep. 1, 2020

(54) METHOD AND SYSTEM FOR USING WHITEBOARD CHANGES AS INTERACTIVE DIRECTIVES FOR VECTORIZATION SOFTWARE

(71) Applicant: Konica Minolta Laboratory U.S.A., Inc., San Mateo, CA (US)

(72) Inventor: Ron R. Hightower, Centennial, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 229 days.

(21) Appl. No.: 15/940,134

(22) Filed: Mar. 29, 2018

(65) Prior Publication Data

US 2019/0303664 A1     Oct. 3, 2019

(51) Int. Cl.
*G06K 9/00* (2006.01)
*G06T 11/20* (2006.01)
*G06F 3/0488* (2013.01)

(52) U.S. Cl.
CPC ..... *G06K 9/00456* (2013.01); *G06F 3/04883* (2013.01); *G06K 9/00664* (2013.01); *G06T 11/206* (2013.01)

(58) Field of Classification Search
None
See application file for complete search history.

(56) References Cited

U.S. PATENT DOCUMENTS

| | | | |
|---|---|---|---|
| 2009/0214134 A1* | 8/2009 | John | H04N 5/23238 382/284 |
| 2010/0245563 A1* | 9/2010 | Golovchinsky | H04N 7/18 348/135 |
| 2018/0285321 A1* | 10/2018 | Antony | G06F 17/212 |
| 2019/0108492 A1* | 4/2019 | Nelson | G10L 15/265 |

* cited by examiner

*Primary Examiner* — Fayyaz Alam
(74) *Attorney, Agent, or Firm* — Buchanan Ingersoll & Rooney PC

(57) ABSTRACT

A method, a non-transitory computer readable medium (CRM), and an apparatus are disclosed for processing images on a writing board. The method includes: capturing a first image of one or more objects on the writing board; capturing a second image of the one or more objects on the writing board after at least one object has been removed and/or modified on the writing board; extracting the at least one object from the first image by comparing the first image to the second image and constructing a digital image via an image processing application; and displaying the digital image of the extracted at least one object on a display screen of a device.

20 Claims, 17 Drawing Sheets

Extracted object can be displayed in highlighted

US 10,762,344 B2

METHOD AND SYSTEM FOR USING WHITEBOARD CHANGES AS INTERACTIVE DIRECTIVES FOR VECTORIZATION SOFTWARE

FIELD OF THE INVENTION

The present disclosure generally relates to a system and method for using whiteboard changes as interactive directives to vectorization software, and more particularly, to a system and method wherein the comparison of two images taken of a writing surface is used to identify interim markings or erasures made by the user, which interim marking or erasures can be then used to infer a region or regions on which the user specifies a desired operation to be performed by the attendant conversion software. For example, these operations by the conversion software may include, but are not limited to, a conversion of the markings to text, a table, a flowchart, and/or vector graphics.

BACKGROUND OF THE INVENTION

Writing boards such as whiteboards and blackboards are frequently used in many different settings (for example, academic, corporate, non-profit, residential, etc.). Various content including text, drawings, arrows, tables, charts, and graphs may be drawn or placed on the writing boards for lectures, training, brainstorming sessions, etc. Additionally or alternatively, similar content may be hand-drawn on a sheet of paper.

In order to electronically memorialize these ideas, a photograph of the writing board may be taken or a scan of the sheet of paper may be executed. Vectorization software may be used to convert such images into more useful electronic formats, for example, line drawings converted into vector graphics and handwritten words converted into text using intelligent character recognition (ICR). However, such vectorization software can be confused by whiteboard drawings that have become complicated and indecipherable over time, unless the human participants assist by identifying separate elements and reducing the complexity of the whiteboard contents.

SUMMARY OF THE INVENTION

In consideration of the above issues, it would be desirable to have a method and system, which can interact with the conversion software, given only the availability of a whiteboard and markers, and wherein both operations are based in the notion of "before" and "after" pictures, and the ability to find specific changes between the two images.

A method is disclosed of processing images on a writing board, the method comprising: capturing a first image of one or more objects on the writing board; capturing a second image of the one or more objects on the writing board after at least one object has been removed and/or modified on the writing board; extracting the at least one object from the first image by comparing the first image to the second image and constructing a digital image via an image processing application; and displaying the digital image of the extracted at least one object on a display screen of a device.

A non-transitory computer readable medium (CRM) storing computer readable program code executed by a processor is disclosed that: captures a first image of one or more objects on a writing board; captures a second image of the one or more objects on the writing board after at least one object has been removed and/or modified on the writing board; extracts the at least one object from the first image by comparing the first image to the second image and constructs a digital image via an image processing application; and displays the digital image of the extracted at least one object on a display screen of a device.

An apparatus is disclosed, comprising: a memory; a camera that: captures a first image of one or more objects on a writing board; and captures a second image of the one or more objects on the writing board after at least one object has been removed and/or modified on the writing board; a processor that: extracts the at least one object from the first image by comparing the first image to the second image and constructs a digital image via an image processing application; and a display screen that displays the digital image of the extracted at least one object.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
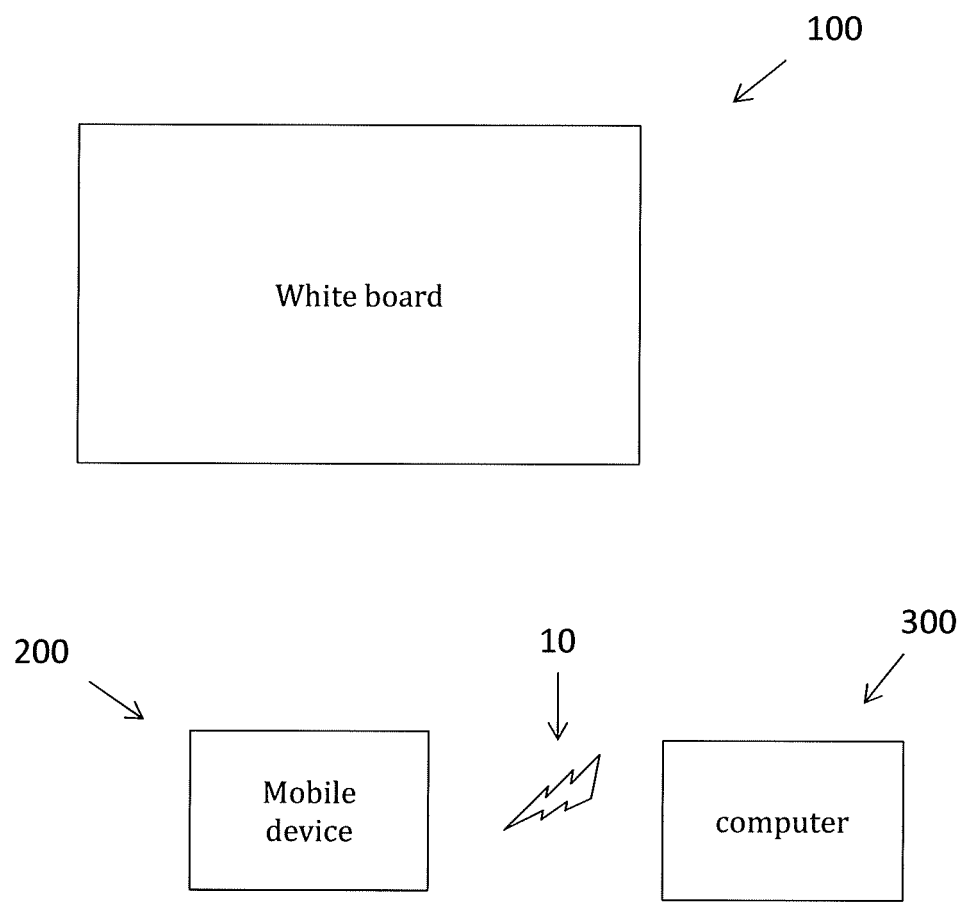
FIG. 1 is an illustration of a system in accordance with an exemplary embodiment, which includes a whiteboard, a mobile device, and a computer.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system in accordance with an exemplary embodiment, which includes a whiteboard (or writing board) 100, a mobile device 200, and a computer 300. In accordance with an exemplary embodiment, the mobile device 200 and the computer 300 can be connected to one another via a communication network or network 10, which can include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, other generations), a wireless connection using radio frequency (RF) and/or infrared (IR) transmission, and/or any other interconnected data path across which multiple devices 200, 300 as disclosed herein may communicate.

In accordance with an exemplary embodiment, a system and method having a document processing program are disclosed, which can compare two or more images that capture the before state and after state of a whiteboard 100. For example, the images may come from individual photographs taken with a mobile device (or smart phone) 200, or they may also come from another device such as a video camera. In the case of a video camera, the user, for example, would specify specific frames via a button press, voice command, or a long pause of where the image does not change. In accordance with an exemplary embodiment, the video camera can be part of the mobile device 200, or a separate video camera, which is designed specifically for video imaging.

In accordance with another exemplary embodiment, any writing surface or writing board, such as a piece of paper, can be used instead of a whiteboard 100. In accordance with an exemplary embodiment, the whiteboard (or writing board) 100 is preferably a markerboard, dry-erase board, wipe board, dry-wipe board, pen-board, or greaseboard having, for example, a glossy, usually white surface for nonpermanent markings. However, the system and method for document processing as disclosed herein can also be used with any writing board including blackboards and erasable boards, and including but not limited to, for example, digital images projected onto a screen, wall, or monitor.

In accordance with an exemplary embodiment, known systems allow for two images to be aligned, including rotation and perspective correction, on the basis of shared image features. The scale-invariant feature transform (SIFT) algorithm, for example, is often used to find local image features which are then used to align images. Once aligned, the images can be compared to identify either the addition of marks or the removal of marks. For example, in accordance with an exemplary embodiment, to recognize the content of an object, which has been handwritten on a writing board, the image processor or image processing software must locate the pixels that contribute to the "intent" of the characters, lines, and text along with various attributes of the geometry of titles, text, flowcharts, and tables as disclosed herein, for example, such as stroke width and line color. Once the pixels are located and identified, the content included in the images (for example, text) can be sent to a recognition module (for example, an intelligent character recognition (ICR) module or an optical character recognition module (OCR module)) hosted on the mobile device 200 or the computer 300 for conversion to a vectorized format. In accordance with an exemplary embodiment, the vectorized data can eventually be incorporated into an editable document, for example, such as those produced by Microsoft® PowerPoint® or Microsoft® Word.

In accordance with an exemplary embodiment, for example, depending on an associated command from the user, or the current mode of the document processing program, different operations will be performed with respect to the added marks and/or the removed marks. For example, as disclosed herein, the method and system can be configured to have the following list of operations: (1) an added mark encircles (or frames) a region of interest, and the process can be directed to convert only the area within the region of interest; or (2) an added mark encircles (or frames) a region of interest, and the user selects a type of conversion, wherein the specified type of conversion is applied to the encircled region (or framed region) for example, the conversion process can execute the image processing on the encircled region, for example, as a "flowchart".

In accordance with an exemplary embodiment, an added mark can be a dividing line between regions. For example, during conversion, a document processing program can be alerted to process the regions separately. For example, on a crowded whiteboard (writing board) different regions might overlap in confusing ways, for example, the title, flowchart(s), text, and/or table(s) may be intermixed with one another.

In accordance with an exemplary embodiment, the removed mark(s) can define a region, and the user provides a label (or identifier). In accordance with an exemplary embodiment, the program can convert the erased region and can identify or name that specified region with a label (or identifier, for example, title, text, flowchart, or text).

In accordance with an exemplary embodiment, the removed mark(s) can define a region, and the user can select a type of conversion. For example, the specified type of conversion can be applied to the erased region. For example, the program can be instructed to process the identified region, for example, as a title, a flowchart, text, or a table. For example, a table can be data arranged with columns and rows. In addition, the converted region can then be shared with other mobile devices 200, for example, to one or more mobile device (or smart phones) 200 linked into the meeting and/or conference.

In accordance with an exemplary embodiment, the removed marks can define an element that is to be processed separately. In this case, the user is simplifying the job of the conversion software or image processing software by isolating elements. In accordance with an exemplary embodiment, all of the elements are to be processed, both those removed and those remaining, and then combined into a final electronic document (or editable document).

Figure 2:
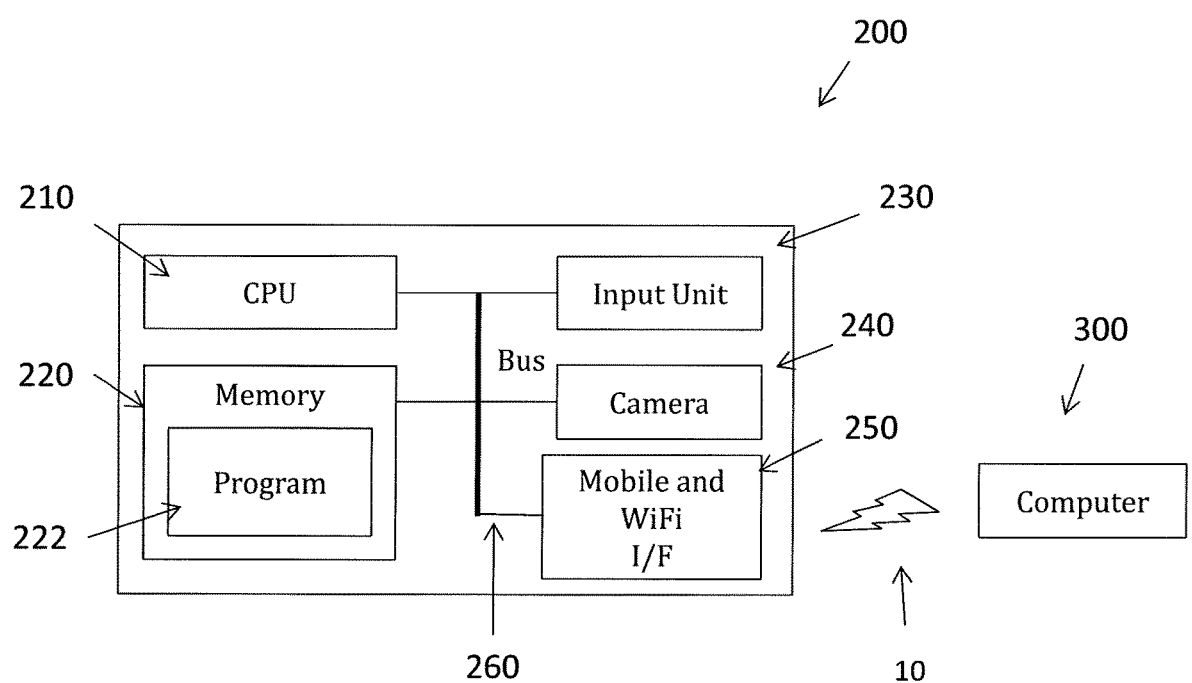
FIG. 2 is an illustration of a mobile device in accordance with an exemplary embodiment.

FIG. 2 is an illustration of a mobile device 200 in accordance with an exemplary embodiment. As shown in FIG. 2, the mobile device 200 can be a cell phone, a smart phone, or similar type device, which includes, for example, a personal computer with a mobile operating system. As shown in FIG. 2, the mobile device 200 can include a computer-processing unit (CPU) 210, a memory 220, which can include an authentication program 222, an input unit 230, a camera 240, and a mobile and WiFi interface (I/F) 250. A bus 260 connects the CPU 210, the memory 220, the input unit 230, the camera 240, the mobile and WiFi I/F 250 to one another within the mobile device 200.

In accordance with an exemplary embodiment, the processor or CPU 210 carries out the instructions of a computer program, which operates and/or controls at least a portion of the functionality of the mobile device 200. The mobile device 200 can also include an operating system (OS), which manages the computer hardware and provides common services for efficient execution of various software programs. For example, the authentication programs (authentication application) 222 can include application software, for example, a software application or document processing program configured to executed the processes as described herein via intelligent character recognition (ICR), optical character recognition (OCR), stroke recognition, and/or reconstruction to extract the contents of the writing board from the image.

In accordance with an exemplary embodiment, the mobile device 200 also includes a display screen 270 (FIG. 5), for example, a touch panel (or touchscreen) on an upper or outer surface of the mobile device 200 in which the user can give input or control the information processing system through gestures by touching the screen with a stylus or one or more fingers of a user.

In accordance with an exemplary embodiment, the mobile device 200 has a camera 240, which is an optical instrument within the mobile device 200 for recording or capturing images, which may be stored locally, transmitted to another location, or both. In accordance with an exemplary embodiment, the mobile service and WiFi (I/F) 250 is configured to receive and send cellular data or communication data between the mobile device 200 and one or more of the cell towers (not shown) or a WiFi interface (WiFi I/F), such that data can be received and sent between the mobile device 200 and another mobile device 200 or computer 300. For example, in accordance with an exemplary embodiment, the mobile device 200 can have an ID recognizer, which directs data between the mobile device 200 and a WiFi router (not shown) and the Internet. The ID recognizer can be, for example, a BSSID basic service set identifier (BSSID), a service set identifier (SDID), a Bluetooth Device Address (BD_ADDR), and/or a near-field communication tag (NFC tag).

Figure 3:
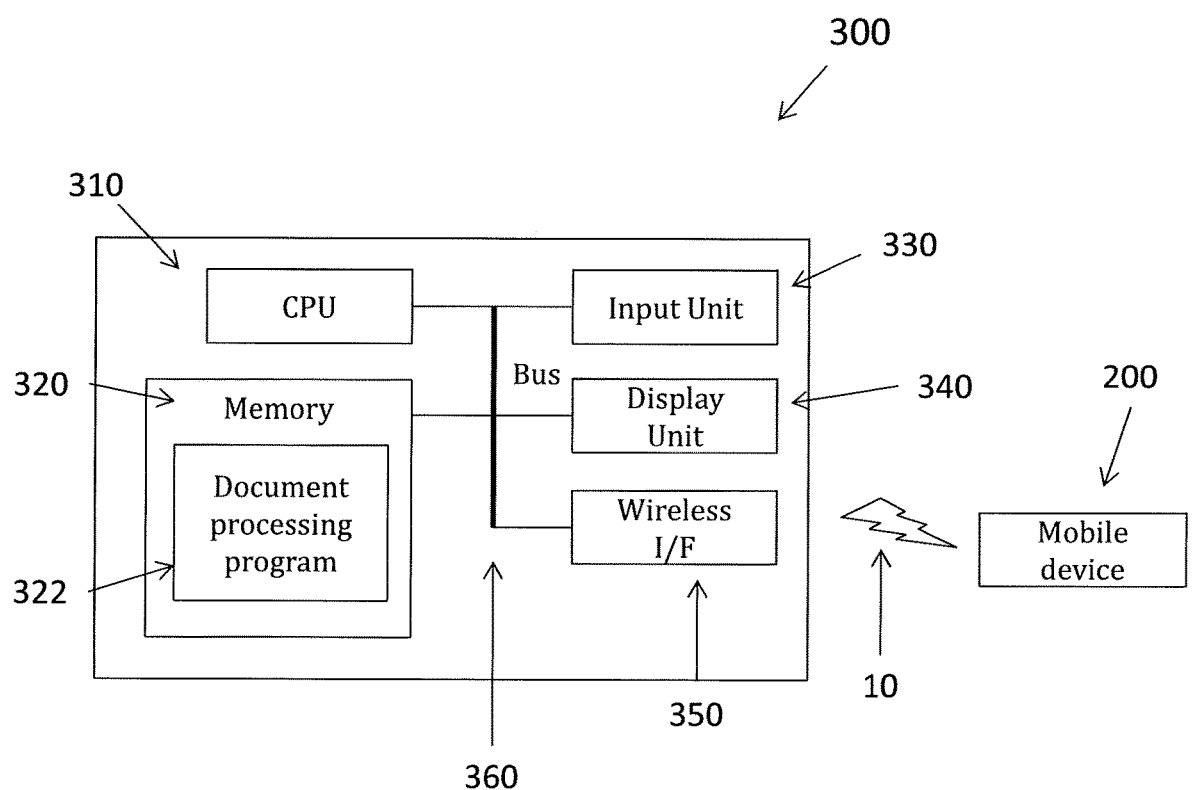
FIG. 3 is an illustration of computer in accordance with an exemplary embodiment.

FIG. 3 is an illustration of computer (or computing system) 300 in accordance with an exemplary embodiment. As shown in FIG. 3, the computer 300 can include a processor or central processing unit (CPU) 310, one or more memories 320 for storing software programs and data, for example, a document processing program 322, an input unit 330, a display unit (or graphical user interface) 340, and a network interface (network I/F), for example, a Wireless I/F 340, which is connected to the communication network (or network) 10. A bus 360 connects the CPU 310, the one or more memories 320 and the document processing program 322, the input unit 330, the display unit 340, and the network I/F (or Wireless I/F) 350 to one another.

In accordance with an exemplary embodiment, the processor or CPU 310 carries out the instructions of a computer program, which operates and/or controls at least a portion of the functionality of the computer 300. The computer 300 can also include an operating system (OS), which manages the computer hardware and provides common services for efficient execution of various software programs and a document processing program as disclosed.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 4:
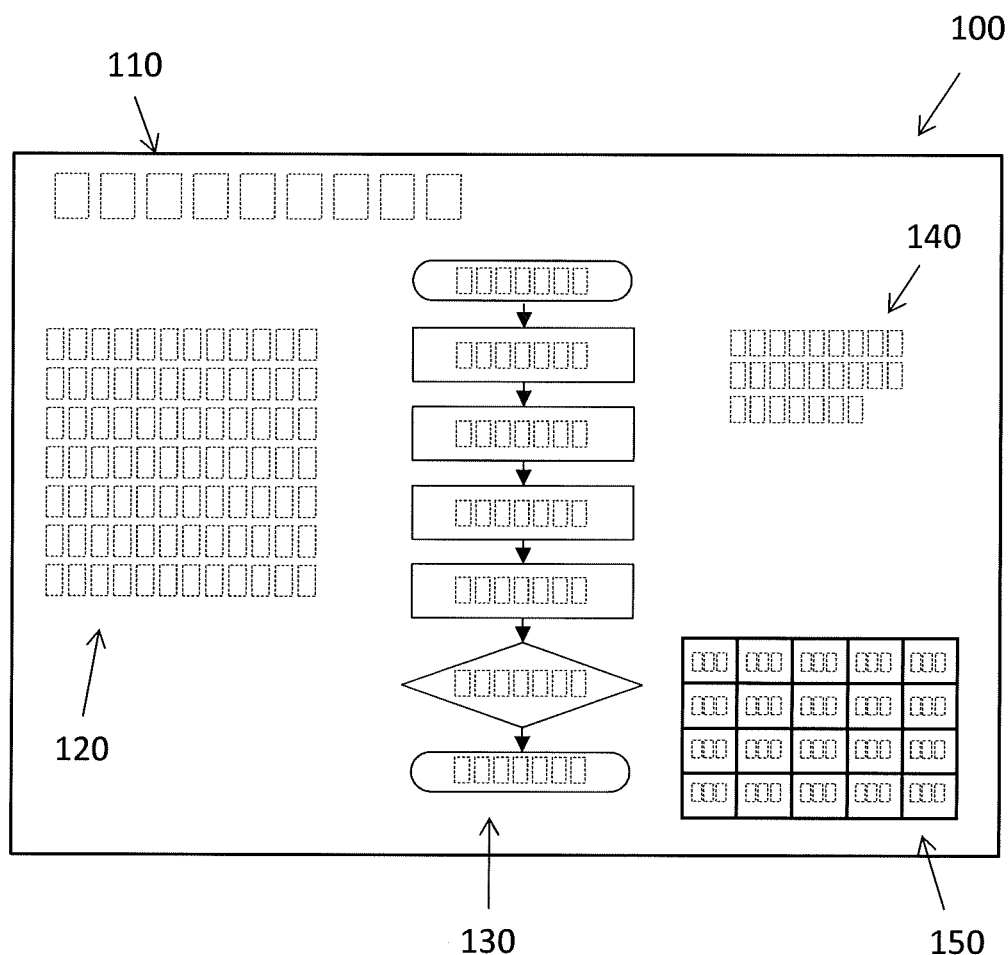
FIG. 4 is an illustration of a whiteboard in accordance with an exemplary embodiment, which includes objects on a whiteboard such as a title, one or more types of texts, a flowchart, and a table.

FIG. 4 is an illustration of a whiteboard 100 in accordance with an exemplary embodiment, which includes objects on the whiteboard 100 such as a title 110, one or more types of texts 120, 140, a flowchart 130, and a table 150. As shown in FIG. 4, the whiteboard 100 can include one or more objects, which can be classified, for example, as a title 110, text 120, 140, a flowchart 130, and a table 150. For example, the title 110 can be one or more words, which describes the subject of the meeting and purpose. The text 120, 140 can be a series of words or marks in a structured and/or random arrangement. The flowchart 130 can be two or more boxes or groups or sets of words preferably connected by an arrow or line. The table 150 being a plurality of boxes or compartments, which includes number and text, which are arranged in a rows and columns.

Figure 5:
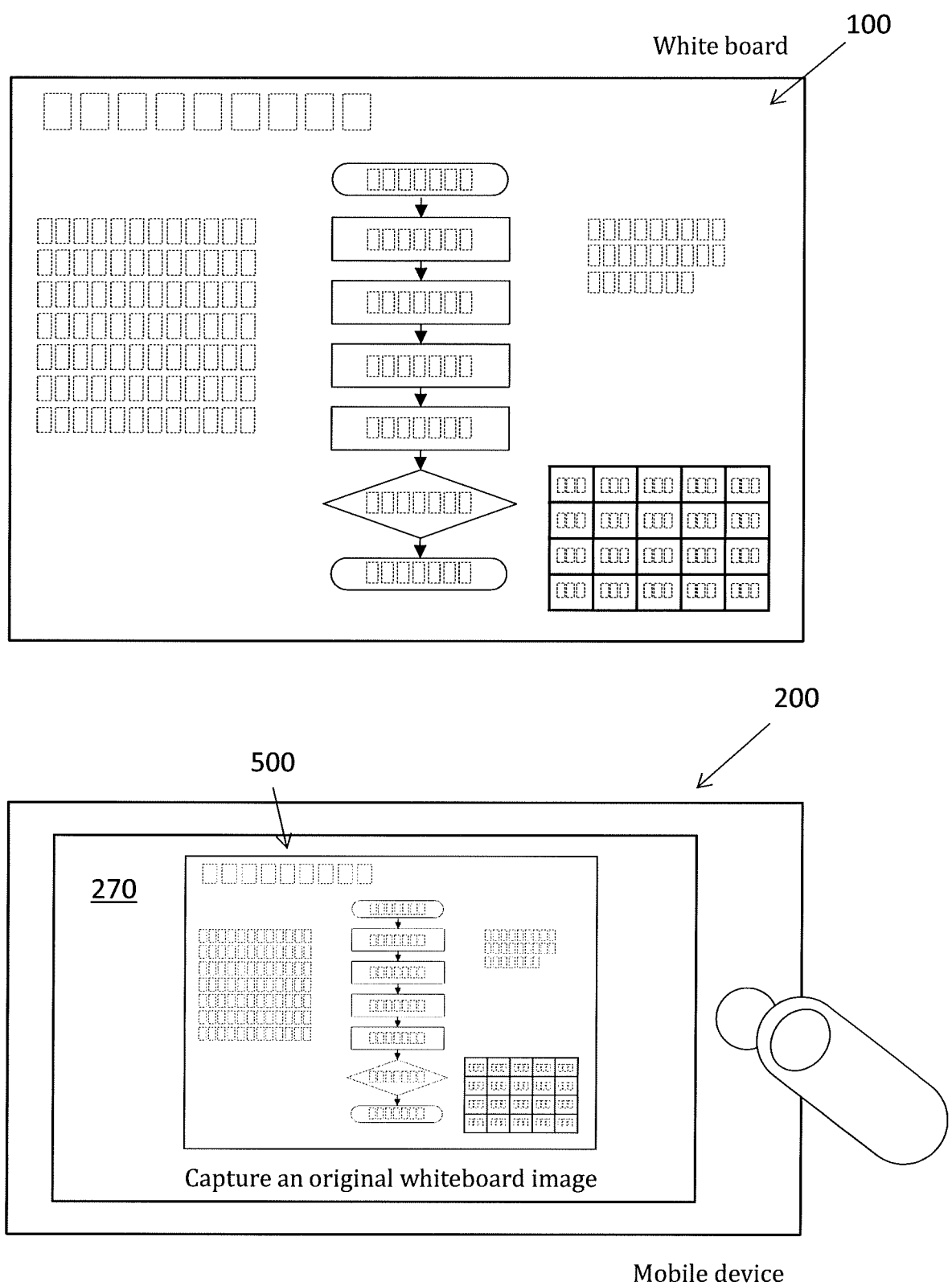
FIG. 5 is an illustration of a display screen of a mobile device capturing an image from a whiteboard in accordance with an exemplary embodiment.

FIG. 5 is an illustration of a display screen 270 of a mobile device 200 capturing an image from a whiteboard 100 in accordance with an exemplary embodiment. As shown in FIG. 5, a user can capture an original whiteboard image 500 using the camera 240 on the mobile device 200. For example, a user can capture an image of the whiteboard 100 by aiming the camera lens on the mobile device 200 towards the whiteboard while observing the image of the whiteboard 100 on the display screen 270 and sending a signal to the mobile device 200 to capture the image, for example, by touch of an image capture box or portion on the display screen with a finger of the user or a stylus. In accordance with an exemplary embodiment, the captured image 500 can be a single image or a plurality of images, for example, captured with a video setting on the mobile device 200.

Figure 6:
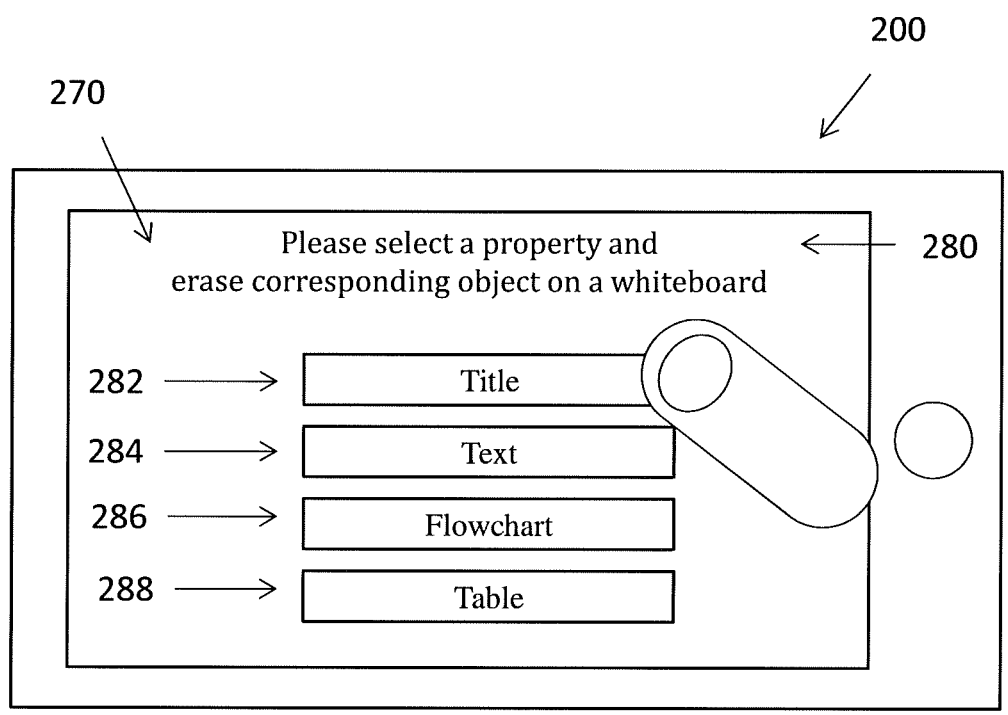
FIG. 6 is an illustration of a display screen on a mobile device having a plurality of selection related to a type of object depicted on the whiteboard.

FIG. 6 is an illustration of a display screen 270 on a mobile device 200 having a plurality of selections 282, 284, 286, 288 related to a type of object depicted on the whiteboard 100 and corresponding conversion process. For example, the display screen can request or ask the user to "Please select a property and erase corresponding object on a whiteboard" 280. The object can include, for example, "Title" 282, "Text" 284, "Flowchart" 286, and "Table" 288. In accordance with an exemplary embodiment, the selection can be made through gestures by touching the display screen 270 with a stylus or one or more fingers of a user. For example, as shown in FIG. 6, the user can select title 282 by touching the display screen 270 with one or more fingers, for example, the user's thumb.

In accordance with an exemplary embodiment, the user's selection can correspond to the desired type of conversion to perform (table, flowchart, bullet list), or a common action such as "e-mail to pc" or "share with everyone in the room". As shown in FIG. 6, selection buttons 282, 284, 286, and 288 provide a method for identifying and/or labeling elements ("this is a title"), and the selection buttons 282, 284, 286, and 288 can also specify a conversion target ("process the selected region as a flowchart"). In accordance with an exemplary embodiment, specifying a conversion target means that the vectorization software does not have to guess the target type, which can be an error prone step. For example, flowcharts and organizational charts are similar, but knowing that a region is an organization chart would suggest many of the text elements can be proper names instead of technical words. Alternatively, tables can be drawn without lines, which might be confusing to a program, which generates a table by counting the number of lines in a region. In addition, for example, with respect to internal data formats, since lines and words can be arranged into the shape of a table, if the software is explicitly told to produce a table structure, for example, as depicted in a Microsoft® PowerPoint document, the lines and words can be correctly formatted into a table or table structure.

Figure 7:
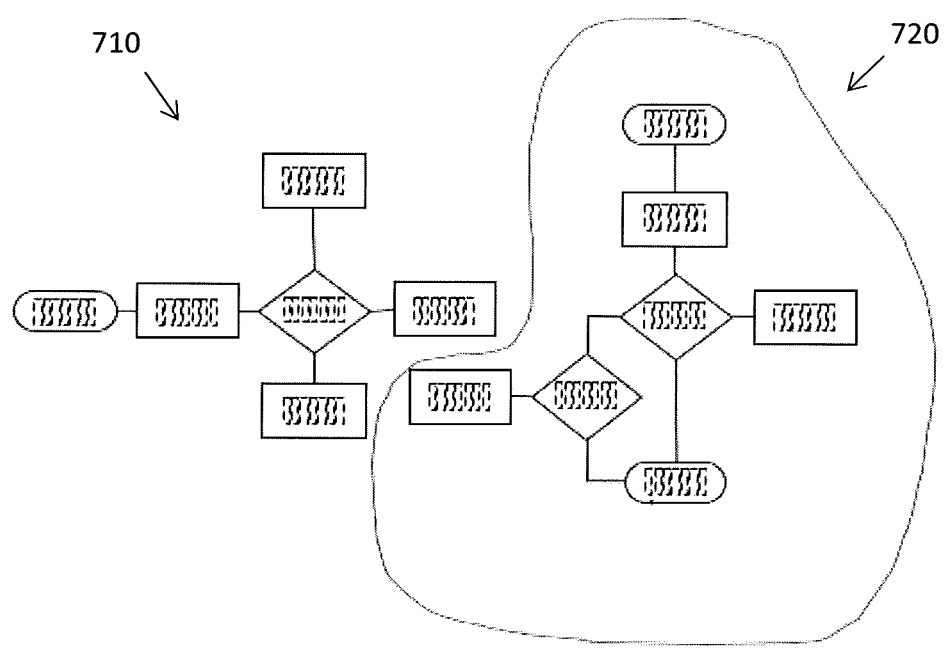
FIG. 7 is an illustration of two flowcharts showing similarities between the two charts and wherein encircling one of the two flowcharts can help vectorization software to convert the encircled flowchart into a flowchart.

FIG. 7 is an illustration of two flowcharts 710, 720 showing similarities between the two charts and wherein encircling one 720 of the two flowcharts 710, 720 can help vectorization software convert the encircled flowchart 720 into a flowchart. For example, where two flowcharts overlap or are in close proximity to one another, by encircling one 720 of the two flowcharts 710, 720, the vectorization software can process the correct flowchart on the white board in order to prevent the conversion software from merging the two flowcharts 710, 720 into a single flowchart.

Figure 8:
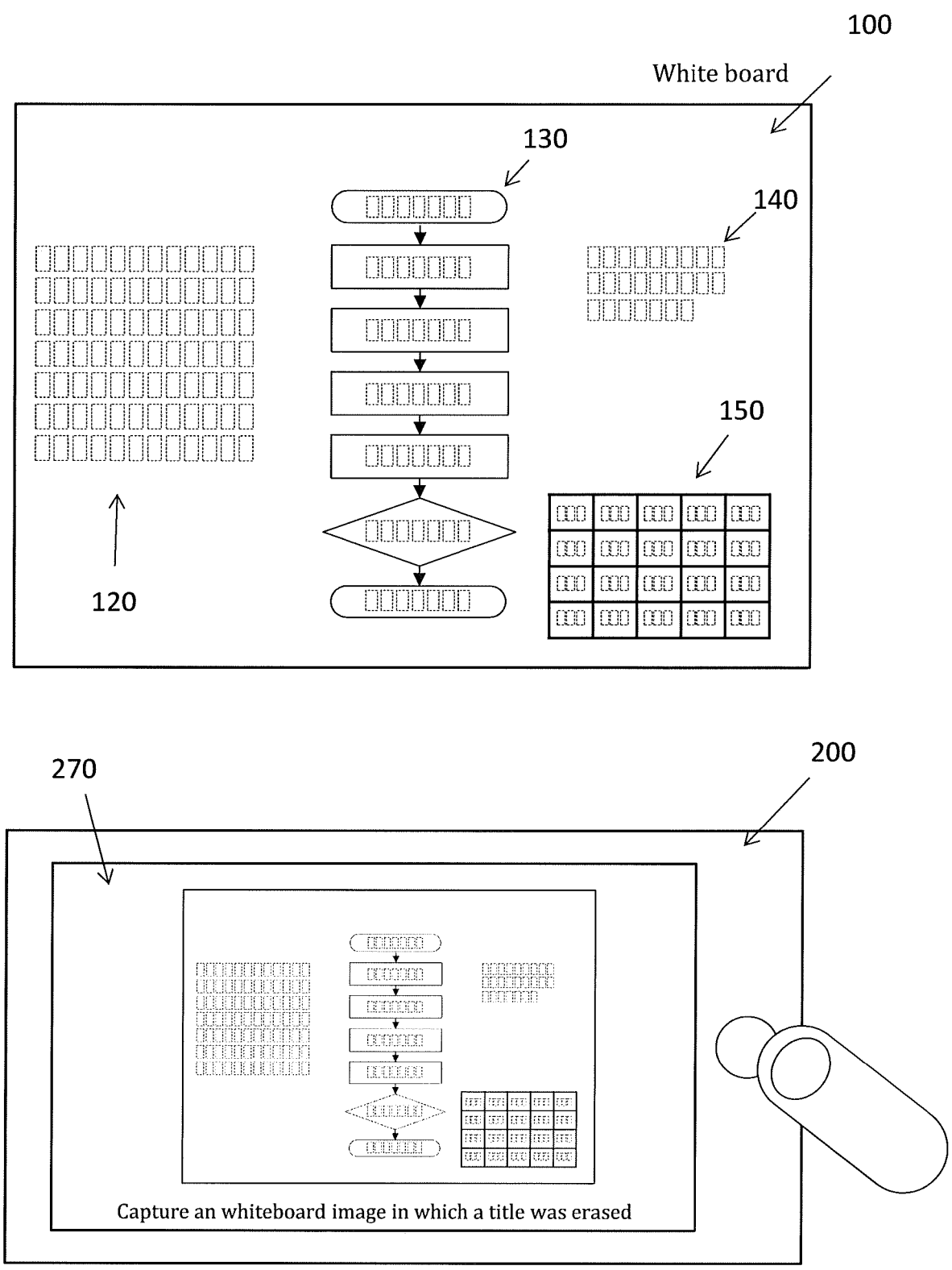
FIG. 8 is an illustration of a display screen of a mobile device capturing an image from a whiteboard in accordance with an exemplary embodiment in which one or more objects has been removed or erased on the whiteboard in comparison to a previously captured image.

FIG. 8 is an illustration of a display screen 270 of a mobile device 200 capturing an image from a whiteboard 100 in accordance with an exemplary embodiment in which one or more objects has been removed or erased on the whiteboard in comparison to a previously captured image. As shown in FIG. 8, after the user selects one or more objects on the display screen 270, which are going to be erased (for example, removed by the user). For example, as shown in FIG. 8, the user erases (or removes) the title 110 from the whiteboard 100 and subsequently captures an image of the whiteboard 100 with the title removed.

Figure 9:
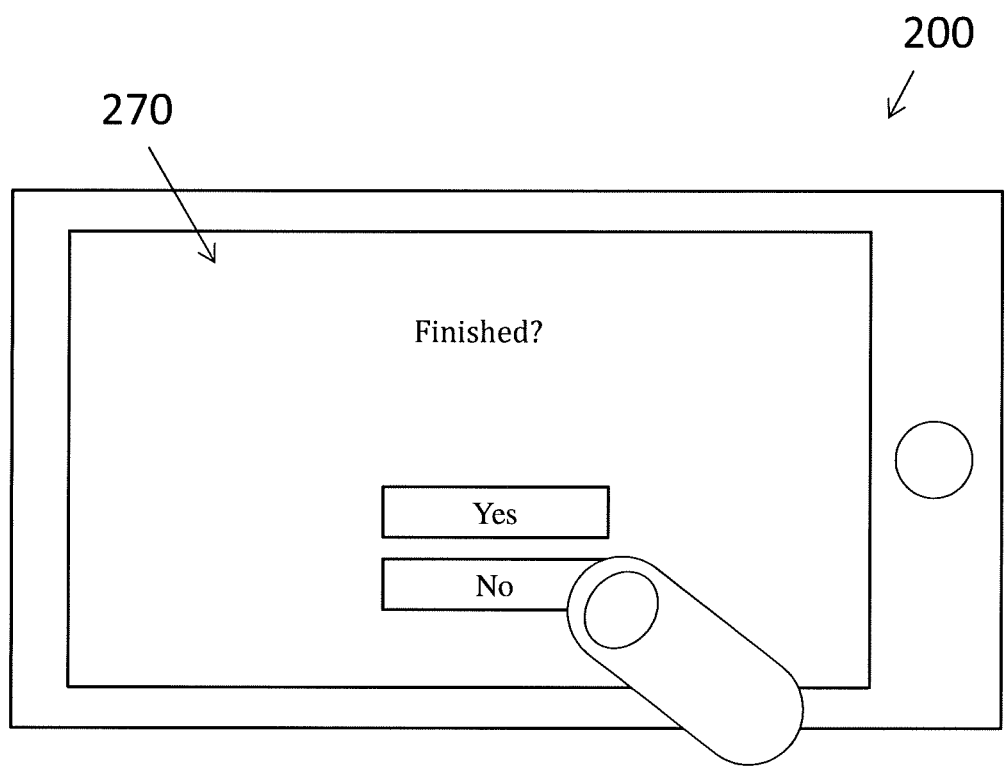
FIG. 9 is an illustration of a display screen of a mobile device with a user prompt in accordance with an exemplary embodiment.

FIG. 9 is an illustration of a display screen 270 of a mobile device 200 with a user prompt in accordance with an exemplary embodiment. As shown in FIG. 9, once the image has been captured, the document processing program on the mobile device 200 can ask the user if the action previously selected in FIG. 6 has been "Finished?" with a "Yes" or "No" response. For example, the selection can be preferably made by touch of the display screen 270.

Figure 10:
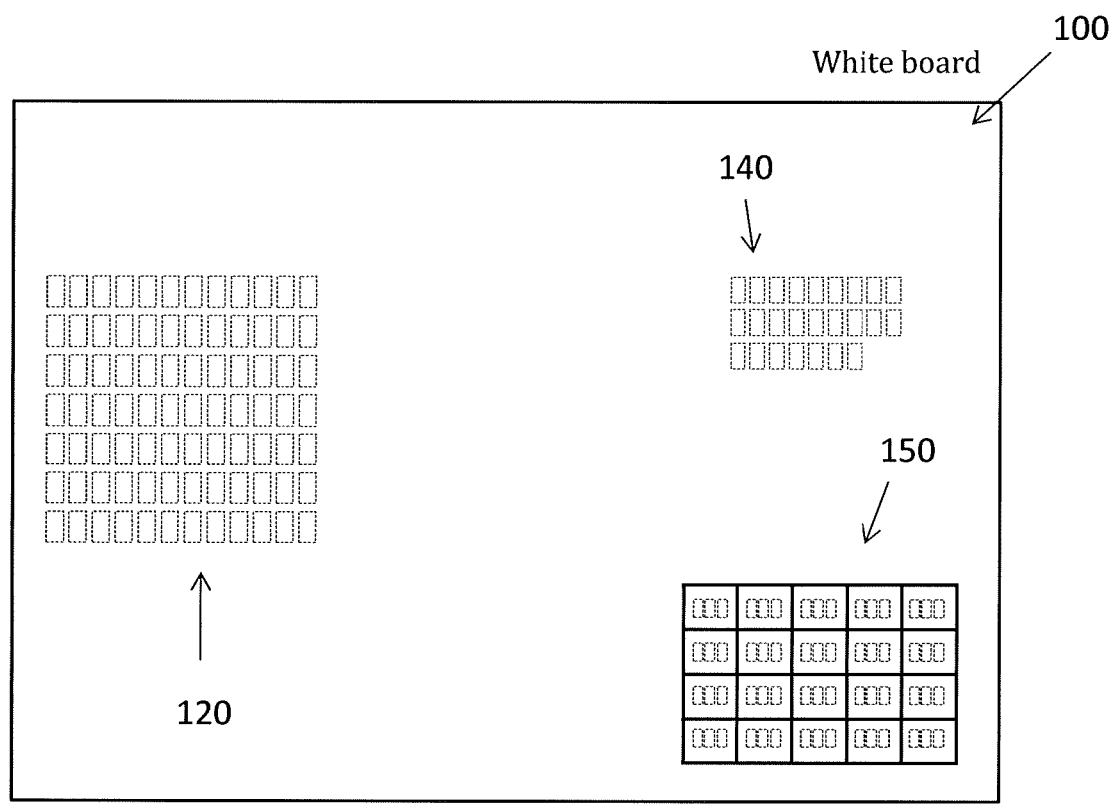
FIG. 10 is an illustration of a display screen on a mobile device capturing an image of a whiteboard in accordance with another exemplary embodiment in which another of the one or more objects has been removed or erases on the whiteboard in comparison to a previously captured image.
Figure 10:
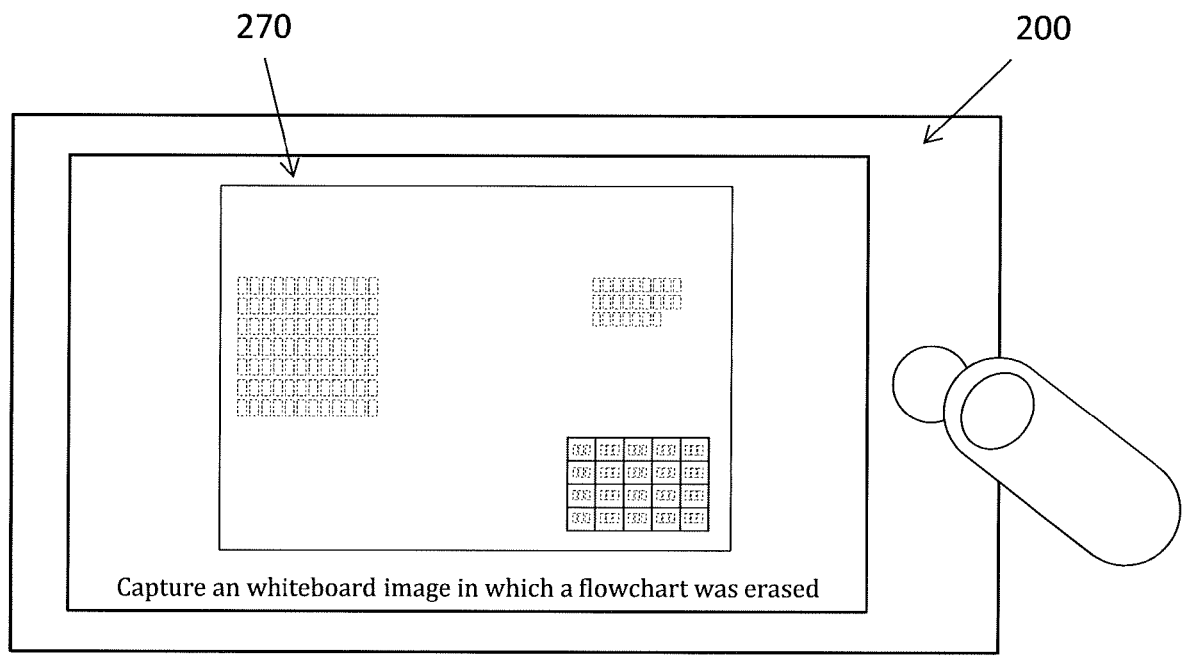

FIG. 10 is an illustration of a display screen 270 on a mobile device 200 capturing an image of a whiteboard 100 in accordance with another exemplary embodiment in which another of the one or more objects has been removed or erased on the whiteboard 100 in comparison to a previously captured image. For example, as shown in FIG. 10, the flowchart 130 has been removed from whiteboard 100 and the image captured by the mobile device 200.

Figure 11:
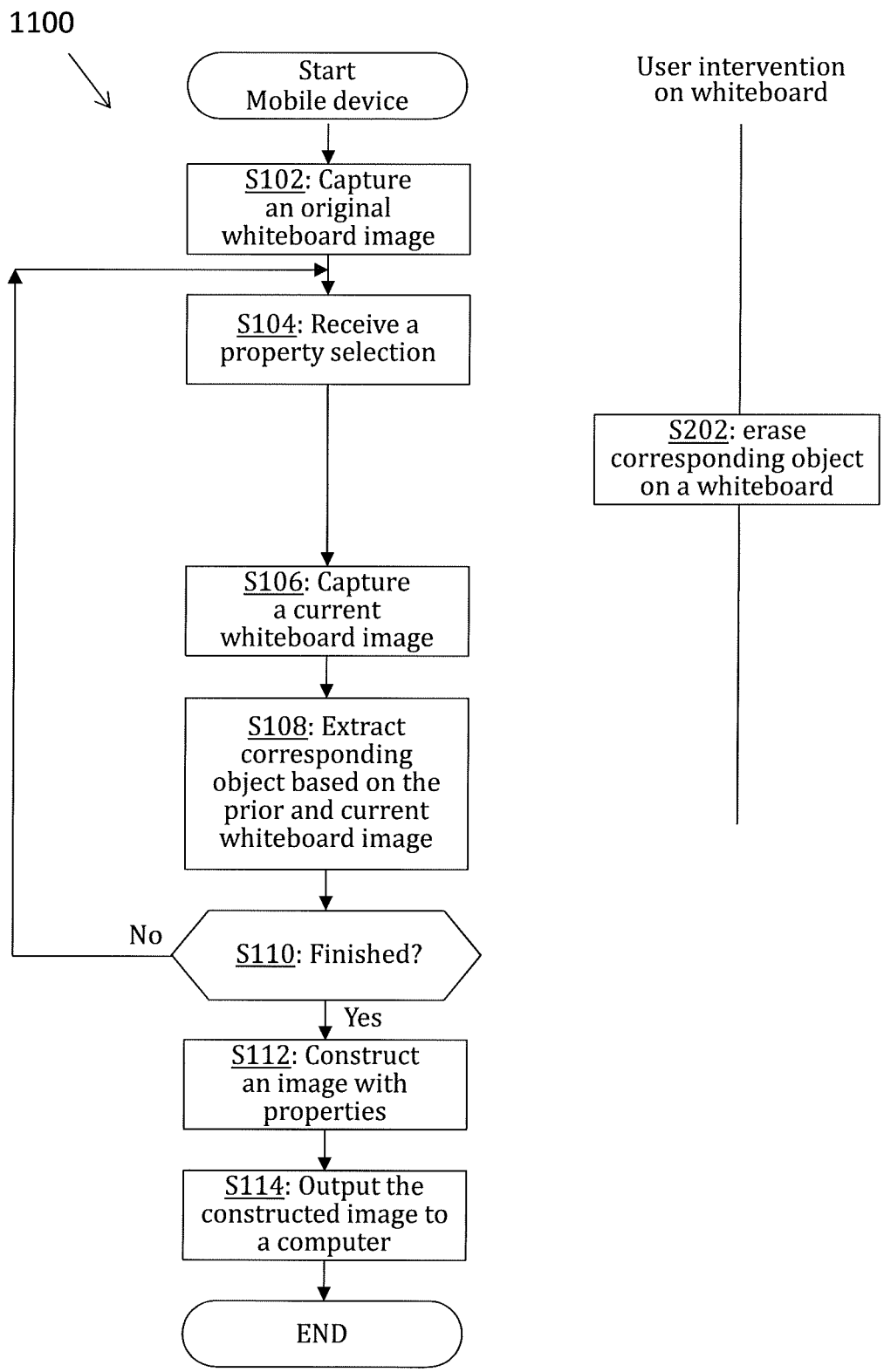
FIG. 11 is a flowchart illustrating a method of using whiteboard changes as interactive directives to an image processing application in accordance with an exemplary embodiment.

FIG. 11 is a flowchart 1100 illustrating a method of using whiteboard changes as interactive directives to an image processing application in accordance with an exemplary embodiment. As shown in FIG. 11, the mobile device 200 is started or turned on and set to a setting (for example, a document processing program) in which images, for example, a single image (or still image) or a plurality of images (or a video stream) can be captured. In step S102, an original whiteboard image is captured by the camera 240 of the mobile device 200. In step S104, the user on the mobile device 200 receives a request to "Please select a property and erase corresponding object on a whiteboard" (FIG. 6), and an object is selected on the display screen 270. In step S202, the corresponding object selected in step S104 can be erased from the whiteboard 100 via user intervention, for example, the whiteboard is erased with an erasure (or digitally manipulated on a digital device).

In step S106, a current image of the whiteboard image with the corresponding object having been erased from the whiteboard 100 is captured by the mobile device 200. In step S108, the document processing program 222 within the mobile device 200 and/or a document processing program 322 in a computer 300, which is in network communication with the mobile device 200 extracts the corresponding object from the two captured images based on the prior and current whiteboard images. In step S110, the user can be asked via the display screen 270, if the corresponding object based on the prior and the current whiteboard image has been extracted. If the corresponding image has not been extracted in step S110, the process returns to step S104. Alternatively, if the corresponding image has been extracted, the process continues to step S112, where the program 222 within the mobile device 200 or the document processing program 322 in the computer 300 constructs an image with the selected properties, for example, a title, a flowchart, text, or a table. In step S114, the constructed image can be output to the mobile device 200 of the user, another mobile device, or the computer 300.

Figure 12:
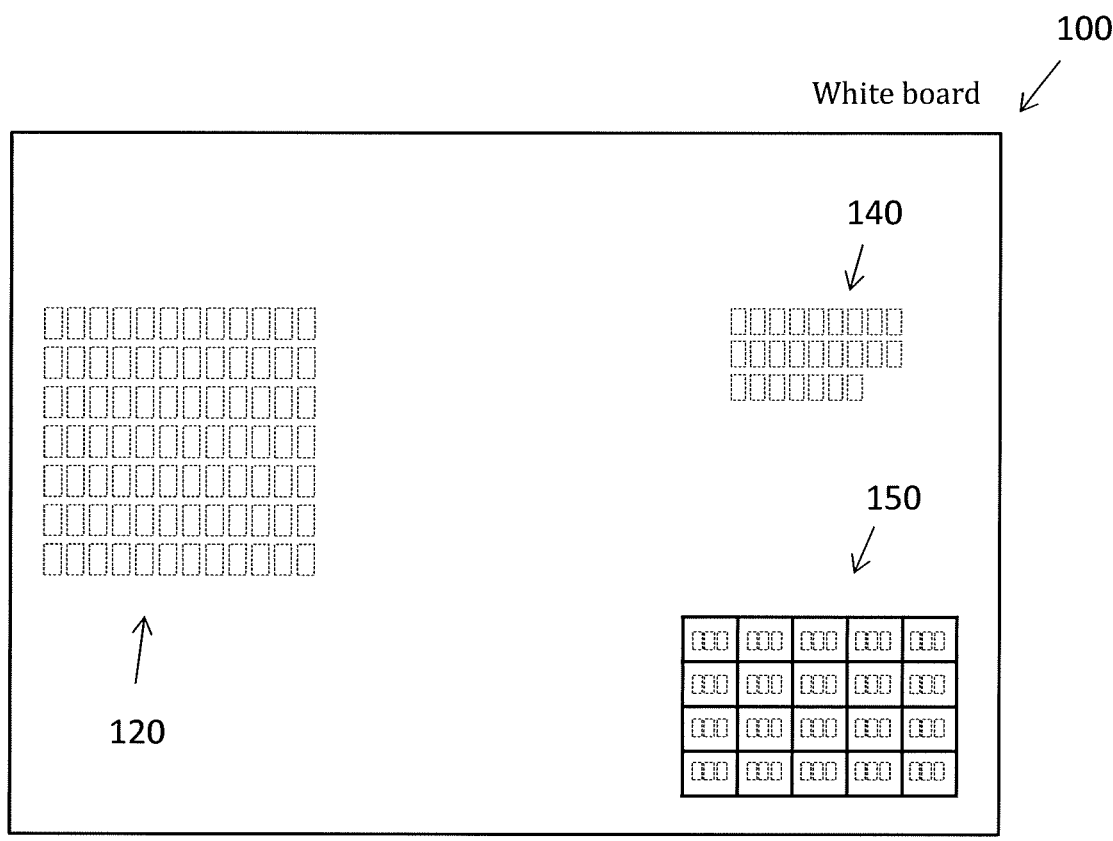
FIG. 12 is an illustration of a display screen on a mobile device in accordance with an exemplary embodiment in which the removed or erased image is displayed on the display screen on the mobile device.
Figure 12:
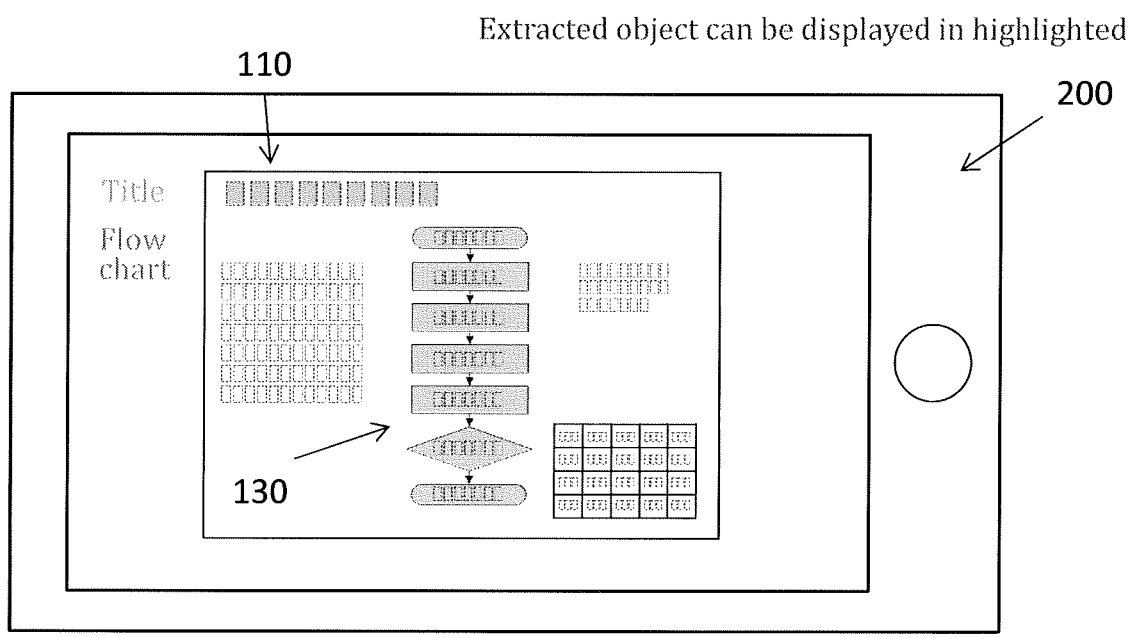

FIG. 12 is an illustration of a display screen 270 on a mobile device 200 in accordance with an exemplary embodiment in which the removed or erased image is displayed on the display screen 270 on the mobile device 200. As shown in FIG. 12, once the processing has been completed by the mobile device 200 or the computer 300, the extracted images, for example, the title 110 and the flowchart 130, can be available or displayed on the display screen 270, in a different color and/or highlighted (for example, visually enhanced by color or other means).

Figure 13:
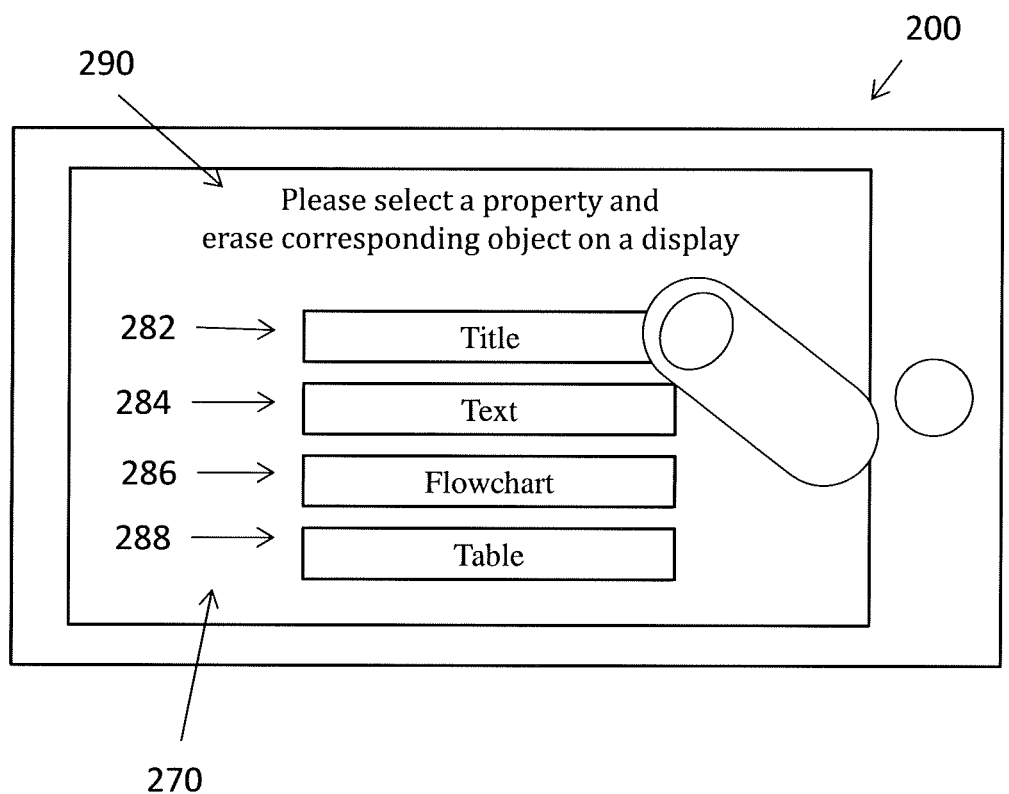
FIG. 13 is an illustration of a display screen on a mobile device with a user prompt in accordance with an exemplary embodiment.

FIG. 13 is an illustration of a display screen 270 on a mobile device 200 with a user prompt in accordance with an exemplary embodiment. Once the objects have been extracted and displayed on the display screen 270 of the mobile device 200, the user can be asked if they wish to erase a corresponding object on the display screen 270. For example, as shown in FIG. 13, the display screen can include a prompt, which asks the user to "Please select a property and erase corresponding object on a display" 290. The corresponding objects can include "Title" 282, "Text" 284, "Flowchart" 286, and "Table" 288. In accordance with an exemplary embodiment, the selection can be made via touch of the display panel 270.

Figure 14:
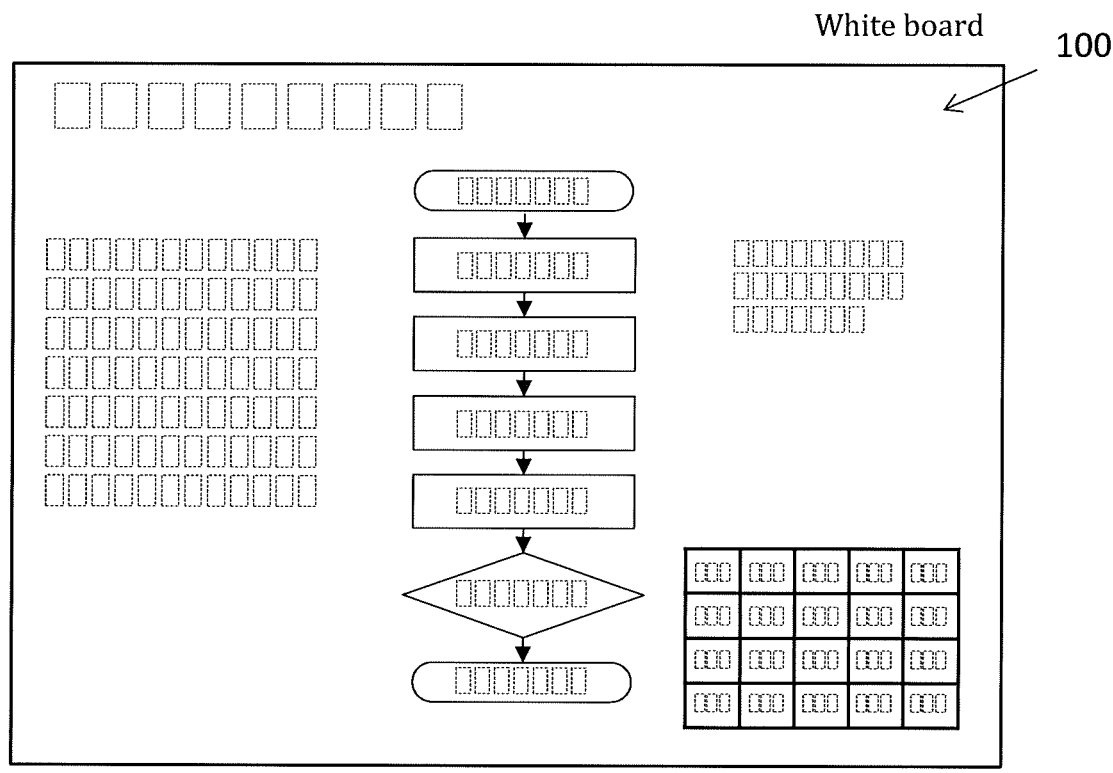
FIG. 14 is an illustration of display screen on a mobile device and a whiteboard in accordance with another exemplary embodiment in which a portion of the image from the whiteboard can be erased on the display screen.
Figure 14:
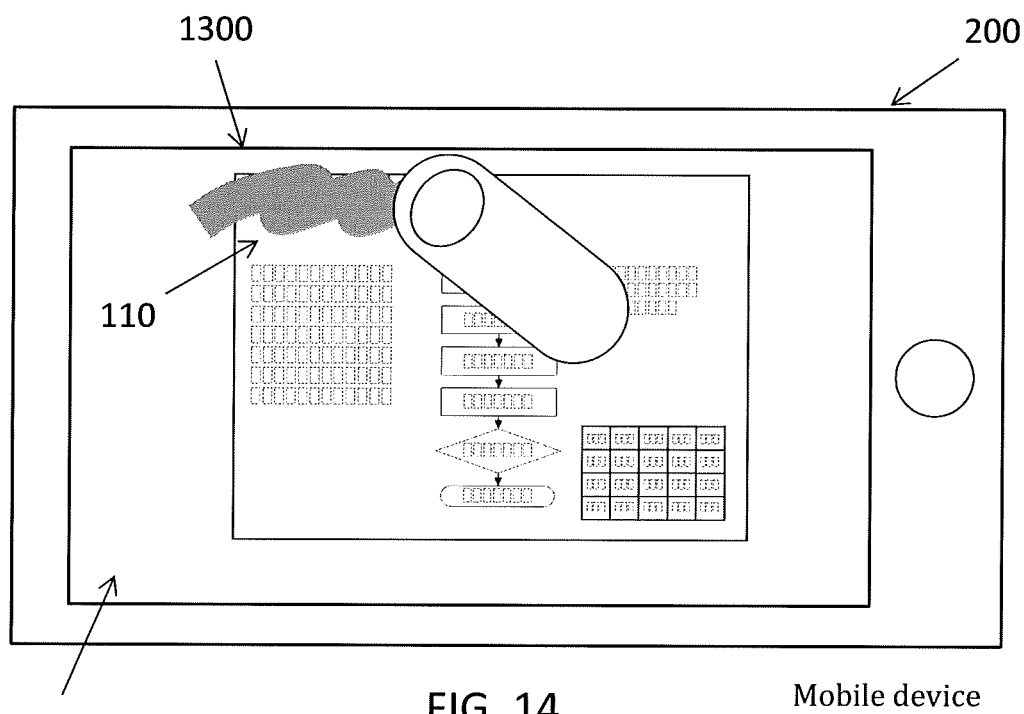

FIG. 14 is an illustration of display screen 270 on a mobile device 200 and a whiteboard 100 in accordance with another exemplary embodiment in which a portion of the image from the whiteboard 100 can be erased on the display screen 200. For example, as shown in FIG. 14, the "Title" 282 can be selected and the user can highlight the Title 282 on the display screen 270 by swiping back and forth (or alternatively, placing an "X" on the screen on the Title) with a finger to erase the Title 282 from process image as shown on the display screen 270 of the mobile device 200.

Figure 15:
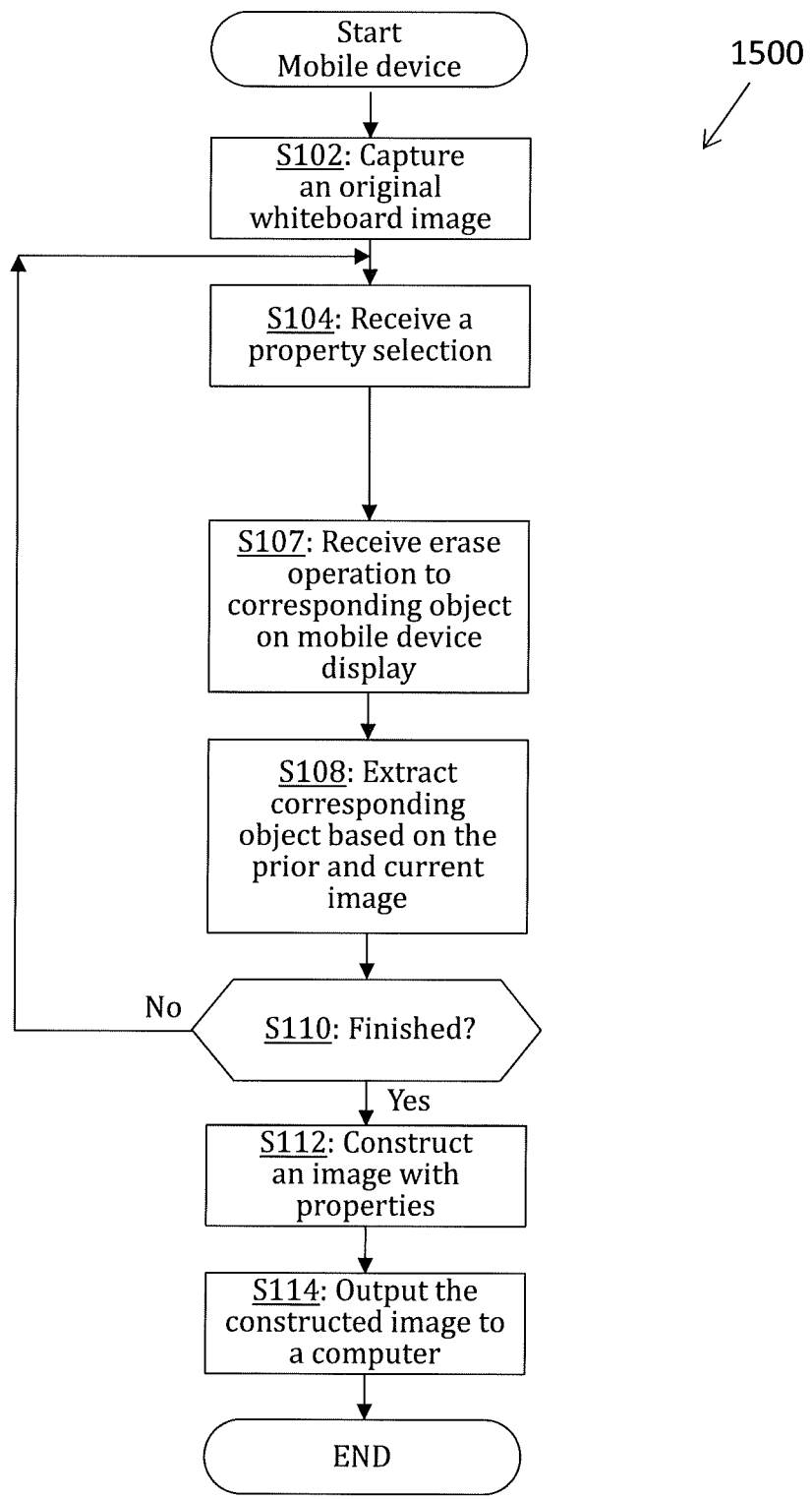
FIG. 15 is a flowchart illustrating a method of using whiteboard changes as interactive directives to an image processing application in accordance with another exemplary embodiment.

FIG. 15 is a flowchart 1500 illustrating a method of using whiteboard changes as interactive directives to an image processing application in accordance with another exemplary embodiment. As shown in FIG. 15, the mobile device 200 is started (or turned on) and set to a setting (for example, a document processing program) in which images, for example, a single image (or still image) or a plurality of images (or a video stream) can be captured. In step S102, an original whiteboard image is captured by the camera 240 of the mobile device 200. In step S104, the user on the mobile device 200 receives a request to "Please select a property and erase corresponding object on a whiteboard" (FIG. 6), and an object is selected on the display screen 270, and processed as set forth above and shown in FIG. 11.

In accordance with an exemplary embodiment, in step S107, the user can be asked if they wish to erase a corresponding object, which has been processed (as set forth above in FIG. 11) on the display screen 270 as shown in FIG. 13. Upon the selection of an image to be erased on the display screen 270, in step S108, the document processing program 232, 332, hosted on either the mobile device 200 or the computer 300 can remove the object from the processed image. In step S110, the user can be asked if they are "finished", for example, do they wish to remove an additional object from the processed image previously captured. In step S112, if the corresponding image has been extracted by the user in this embodiment via the display screen 270 on the mobile device 200, the process continues to step S112, where the program 222 within the mobile device 200 or the document processing program 322 in the computer 300 constructs an image with the selected properties, for example, a title, a flow chart, text, or a table. In step S114, the constructed image can be output to the mobile device 200 of the user, another mobile device, or the computer 300.

Figure 16:
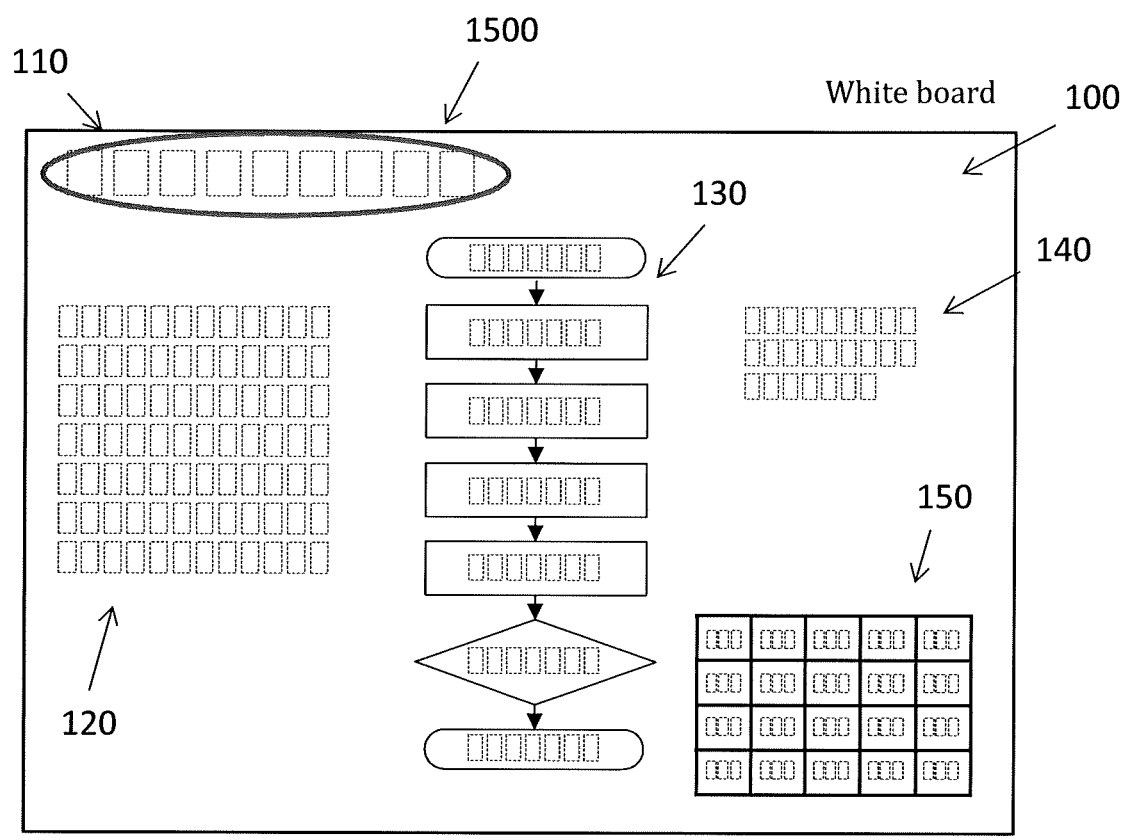
FIG. 16 is an illustration of a method for identifying an object on a whiteboard in accordance with an exemplary embodiment.

FIG. 16 is an illustration of a method for identifying an object on a whiteboard 100 in accordance with an exemplary embodiment. As shown in FIG. 16, in an alternative embodiment to the process as set forth in Step S202, rather than erasing the object from the whiteboard 100 as set forth, the user can select a property, for example, as shown in FIG. 6, and then circle or highlight the object on the whiteboard 100. The encircled, framed, or highlighted portion of the whiteboard 100 is then compared to the original captured image and the encircled, framed, or highlight portion is then extracted and processed by the document processing program as disclosed. In addition, once the first and the second images are processed, the encircling, framing, or highlighting mark is not processed into the final document or image.

Figure 17:
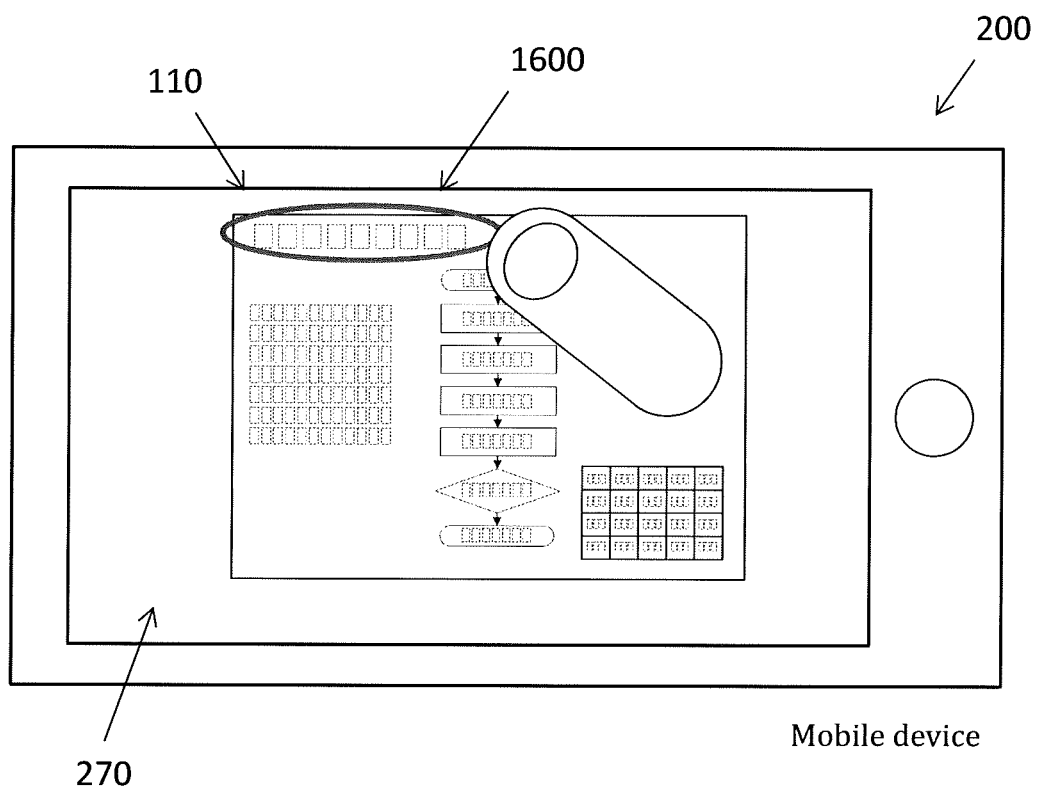
FIG. 17 is an illustration of a display screen of a mobile device and a method for designating an object on a whiteboard in accordance with an exemplary embodiment.

FIG. 17 is an illustration of a display screen 270 of a mobile device 200 and a method for designating an object on a whiteboard 100 as shown in step S104 of FIG. 11. For example, rather than receiving a prompt on the display screen 270, for example, as shown in FIG. 6, the user can select the corresponding object on the display screen, for example, by identifying the object that is to be erased on the whiteboard 100 by encircling the object or another identifier on the display screen 270.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of processing images on a writing board, the method comprising:
capturing a first image of one or more objects on the writing board with a mobile device;
executing a property selection on a display screen of the mobile device, the property selecting corresponding to a classification of at least object to be removed from the writing board, the classification being a title, text, a flowchart or a table;
capturing a second image of the one or more objects on the writing board after at the least one object has been removed from the writing board;
extracting the at least one object from the first image by comparing the first image to the second image and constructing a digital image via an image processing application; and
displaying the digital image of the extracted at least one object on the display screen of the mobile device.

2. The method of claim 1, further comprising:
capturing the first image and the second image with a camera of the mobile device.

3. The method of claim 1, comprising:
executing the property selection corresponding to one of the classifiers of the one or more objects on the display of the mobile device prior to capturing the second image.

4. The method of claim 1, further comprising:
executing the property selection on the display screen of the mobile device by selecting the property selection from a list of property selections.

5. The method of claim 1, further comprising:
executing the property selection on the display screen of the mobile device by performing an operation of encircling or swiping the extracted at least one object on the display screen.

6. The method of claim 1, further comprising:
constructing the digital image via the image processing application according to the property selection.

7. The method of claim 1, comprising:
displaying the extracted at least one object on the display screen with the one or more objects, and wherein the extracted at least one object is display is highlighted or visually enhanced.

8. The method of claim 1, further comprising:
forwarding the extracted at least one object to a device other than the mobile device, which captured the first image and the second image.

9. The method of claim 1, further comprising:
executing the extracting of the at least one object from the first image by comparing the first image to the second image and the construction of the digital image via the image processing application on the mobile device.

10. The method of claim 1, further comprising:
sending the captured first image and the captured second image via a wireless communication from the mobile device to a computing device; and
executing the extracting of the at least one object from the first image by comparing the first image to the second image and the construction of the digital image via the image processing application on the computing device.

11. A non-transitory computer readable medium (CRM) storing computer readable program code executed by a processor that:
captures a first image of one or more objects on a writing board with a mobile device;
executes a property selection on a display screen of the mobile device, the property selecting corresponding to a classification of at least object to be removed from the writing board, the classification being a title, text, a flowchart or a table;
captures a second image of the one or more objects on the writing board after at least one object has been removed from the writing board;
extracts the at least one object from the first image by comparing the first image to the second image and constructs a digital image via an image processing application; and
displays the digital image of the extracted at least one object on the display screen of the mobile device.

12. The non-transitory CRM of claim 11, further comprises:
capturing the first image and the second image with a camera of the mobile device.

13. The non-transitory CRM of claim 11, further comprises:
executing the property selection corresponding to one of the classifiers of the one or more objects on the display of the mobile device prior to capturing the second image.

14. The non-transitory CRM of claim 11, further comprises:
executing the property selection on the display screen of the mobile device by selecting the property selection from a list of property selections, or
executing the property selection on the display screen of the mobile device by performing an operation of encircling or swiping the extracted at least one object on the display screen.

15. The non-transitory CRM of claim 11, further comprises:
constructing the digital image via the image processing application according to the property selection.

16. An apparatus, comprising:
a memory;
a display screen, the display screen configured to receive a property selection, the property selecting corresponding to a classification of at least object to be removed from the writing board, the classification being a title, text, a flowchart or a table;
a camera configured to capture a first image of one or more objects on a writing board and a second image of the one or more objects on the writing board after at least one object has been removed on the writing board; and
a processor that:
extracts the at least one object from the first image by comparing the first image to the second image and constructs a digital image via an image processing application; and
displays the digital image of the extracted at least one object on the display screen.

17. The apparatus of claim 16, wherein the apparatus is a mobile device, and further comprises:
capturing the first image and the second image with the camera of the mobile device.

18. The apparatus of claim 16, further comprises:
receiving the property selection corresponding to one of the classifiers of the one or more objects from the apparatus prior to capturing the second image.

19. The apparatus of claim 18, further comprises:
executing the property selection on the display screen of the apparatus by selecting the property selection from a list of property selections, or
executing the property selection on the display screen of the by performing an operation of encircling or swiping the extracted at least one object on the display screen.

20. The apparatus of claim 18, wherein the processor is configured to:
construct the digital image via the image processing application according to the property selection.

* * * * *